United States Patent
Okumura

(10) Patent No.: US 6,776,172 B2
(45) Date of Patent: Aug. 17, 2004

(54) METHOD OF CLEANING ULTRAPURE WATER SUPPLY SYSTEM

(75) Inventor: Masatake Okumura, Tokyo (JP)

(73) Assignee: Kurita Water Industries Ltd., Tokyo (JP)

(*) Notice: Subject to any disclaimer, the term of this patent is extended or adjusted under 35 U.S.C. 154(b) by 8 days.

(21) Appl. No.: 10/089,972

(22) PCT Filed: Aug. 9, 2001

(86) PCT No.: PCT/JP01/06842
§ 371 (c)(1),
(2), (4) Date: Apr. 8, 2002

(87) PCT Pub. No.: WO02/13981
PCT Pub. Date: Feb. 21, 2002

(65) Prior Publication Data
US 2002/0137650 A1 Sep. 26, 2002

(30) Foreign Application Priority Data
Aug. 10, 2000 (JP) .................. 2000-242602

(51) Int. Cl.$^7$ .................. B08B 9/027; C23G 1/14; C23G 3/04
(52) U.S. Cl. ............... 134/22.11; 134/22.12; 134/22.13; 210/900
(58) Field of Search ................. 210/668, 669, 210/681, 683, 684, 685, 749, 767, 900, 696; 134/22.11, 22.12, 22.13, 22.14

(56) References Cited

U.S. PATENT DOCUMENTS

| | | | | |
|---|---|---|---|---|
| 5,246,586 A | * | 9/1993 | Ban et al. .................. 210/638 |
| 5,360,488 A | * | 11/1994 | Hieatt et al. .............. 134/22.11 |
| 5,885,364 A | * | 3/1999 | Hieatt et al. .............. 134/22.11 |
| 6,627,089 B1 | * | 9/2003 | Wilkinson .................. 210/754 |

FOREIGN PATENT DOCUMENTS

| | | |
|---|---|---|
| GB | 1420720 A | 1/1976 |
| JP | 288583 A | 12/1991 |
| JP | 6-82939 A | 3/1994 |
| JP | 7-195073 A | 8/1995 |
| JP | 8-11992 A | 1/1996 |
| JP | 08-144075 A | 6/1996 |
| JP | 10-128254 A | 5/1998 |
| JP | 11-165049 A | 6/1999 |
| JP | 2000-208471 A | 7/2000 |
| JP | 2000-279906 A | 10/2000 |
| JP | 2000-317413 A | 11/2000 |
| JP | 2002-501426 A | 1/2002 |
| WO | WO 94/21865 A | 9/1994 |
| WO | WO 98/39110 A1 | 9/1998 |

* cited by examiner

Primary Examiner—Robert James Popovics
(74) Attorney, Agent, or Firm—Frishauf, Holtz, Goodman & Chick, P.C.

(57) ABSTRACT

A cleaning method is provided for an ultrapure water supply system having an ultrapure water production apparatus connected to a point of use of ultrapure water via a passage. In the cleaning method, a basic solution, for example, is circulated through the system to change the surface potential of fine particles in the system from an opposite to the same polarity as that of elements constituting the system, thereby facilitating the removal of the fine particles, and the fine particles are then discharged from the system to outside together with the basic solution. The cleaning method has excellent cleaning capability and also makes it possible to shorten the rinsing time required for removing the residual constituent of the cleaning solution.

10 Claims, 4 Drawing Sheets

METHOD OF CLEANING ULTRAPURE WATER SUPPLY SYSTEM

This application is a national phase application of International Application PCT/JP01/06842 filed Aug. 9, 2001.

TECHNICAL FIELD

The present invention relates to a method of cleaning an ultrapure water supply system, and more particularly, to a method of cleaning a system for supplying ultrapure water used in semiconductor manufacturing process etc.

BACKGROUND ART

As for ultrapure water used in the cleaning step of semiconductor manufacturing process or the like, an ultrapure water supply system is known which circulates ultrapure water between an ultrapure water production apparatus and a point of use. In such a system, the ultrapure water produced by the ultrapure water production apparatus is supplied through a pipe to the point of use, and the remaining part of the ultrapure water that was not used in the point of use is returned through a different pipe to the ultrapure water production apparatus.

The ultrapure water used in the semiconductor manufacturing process or the like is required that it should not contain fine particles, organic matter and inorganic matter. Specifically, the ultrapure water is expected to meet requirements of, for example, the resistivity being 18.2 MΩ·cm or more, fine particles contained being 1/mL or less, viable cells contained being 1/L or less, total organic carbon (TOC) contained being 1 μg/L or less, silica contained being 1 μg/L or less, metals contained being 1 ng/L or less, and ions contained being 10 ng/L or less.

Thus, also in the above ultrapure water supply system, the ultrapure water supplied to the point of use must satisfy these water quality requirements. However, external fine particles or particles produced inside the system can become mixed with the ultrapure water, causing deterioration of the water quality.

For example, as the ultrapure water keeps circulating through the ultrapure water supply system, the surfaces of a filtration membrane, pipes, etc. of the system are worn away, and the worn-off substances (fine particles) become mixed with the ultrapure water. Also, where the system has been stopped for a long term, fine particles such as dead bacteria or iron dust become mixed with the raw water or ultrapure water stagnating in the system. Further, in the case of a newly installed ultrapure water supply system, various kinds of fine particles remain stuck on the surfaces of the filtration membrane and pipes which are component elements constituting the system. Also, while the system is under construction, fine particles such as dust in the air, silica and aluminum enter the system and adhere to various parts of the system. When the newly installed system is set in operation, therefore, such fine particles adhering to the interior of the system become mixed with the ultrapure water circulating through the system.

Thus, in order to remove such fine particles, the ultrapure water supply system needs to be cleaned prior to the start of operation as well as at regular intervals of time. Conventionally, warm water or water containing hydrogen peroxide is used to clean the system. However, in the case of warm water, for example, the cleaning capability is low and it is probable that fine particles in the system cannot be satisfactorily removed. In Unexamined Japanese Patent Publication (KOKAI) No. 7-195073 is proposed a cleaning technique using alcohol with high cleaning capability. To remove fine particles to a satisfactory level, however, it is essential to use alcohol having relatively high concentration (about 10 to 80%). Since alcohol, if left in the system, deteriorates the quality (increases the TOC) of the ultrapure water produced by the system, a residual alcohol removing operation (rinsing) must be performed, which, however, prolongs the overall cleaning time.

Such a long cleaning time lowers the operating efficiency of the ultrapure water supply system as well as of the plant using the system, and therefore, the cleaning time should desirably be shortened. Especially in the case of a newly installed ultrapure water supply system, a set-up or preparatory time required for the system to produce ultrapure water meeting the requirements is usually as long as a whole month, and accordingly, there has been a demand for techniques capable of shortening the set-up time.

A cleaning method is also known in which, when a filtration membrane constituting the ultrapure water production apparatus is manufactured or attached to the apparatus, the filtration membrane is cleaned using ultrapure water to an extent such that the resistivity and TOC of the ultrapure water fall within respective allowable ranges. With this method using ultrapure water, fine particles that affect the resistivity or TOC can be removed, but it is probable that other kinds of fine particles are not satisfactorily removed.

DISCLOSURE OF THE INVENTION

An object of the present invention is to provide a cleaning method capable of satisfactorily cleaning an ultrapure water supply system and component elements thereof in a short period of time.

To achieve the object, the present invention provides a cleaning method for cleaning at least part of an ultrapure water supply system having an ultrapure water production apparatus connected to a point of use of ultrapure water via a passage. The cleaning method of the present invention comprises the steps of: (a) changing surface potential of fine particles present in the at least part of the ultrapure water supply system; and (b) discharging the fine particles from the at least part of the ultrapure water supply system to outside.

Fine particles in the ultrapure water supply system can occasionally be charged with electricity. If the surface potential of such charged fine particles is opposite in polarity to that of elements constituting the system, the fine particles adhere to the system elements due to electrostatic attractive force acting between the system elements and the fine particles, making it difficult to remove the fine particles. In the method according to the present invention, the surface potential of the fine particles is changed, preferably into the same polarity as that of the system elements, to eliminate the electrostatic attractive force acting between the fine particles and the system elements, preferably to produce electrical repulsive force between the fine particles and the system elements, so that the fine particles can be removed with ease. While in this state, ultrapure water, for example, is caused to flow through the system, thereby to discharge the fine particles from the system to outside. According to the present invention, therefore, the whole or appropriate part of the ultrapure water supply system can be cleaned satisfactorily in a short time. Also, it is possible to shorten the set-up time of a newly installed system.

Preferably, in the step (a), the fine particles are made to contact with a basic or alkaline solution or a solution of surfactant.

According to this preferred embodiment, by making the fine particles contact with the basic solution or the solution of surfactant, the surface potential of the fine particles can be changed without fail. Also, even if the solution (cleaning liquid) used has a low concentration of base or surfactant, the solution can produce a satisfactory effect of changing the surface potential of the fine particles. Where a low-concentration solution is used for the cleaning, the constituent of the solution remaining in the cleaned system, that is, the base or the surfactant, is small in quantity. As a consequence, there is a small possibility that the TOC of ultrapure water produced in the system after the cleaning will increase due to the residual constituent of the solution. Also, in cases where additional cleaning (rinsing) is performed using ultrapure water, for example, to remove the residual constituent of the solution, the cleaning time may be short in length, thus permitting the system cleaning as a whole, which includes the cleaning by means of the cleaning liquid (solution) and the cleaning (rinsing) by means of the ultrapure water, to be completed in a short period of time. In the step (b) of the preferred embodiment, the basic solution or the solution of surfactant, which was made to contact with the fine particles, is merely discharged from the ultrapure water supply system, for example. Alternatively, after the solution is discharged, ultrapure water for rinsing is introduced into the system and then the fine particles are discharged from the system to outside together with the rinsing ultrapure water.

According to the present invention, preferably in the step (a), not only the surface potential of the fine particles is changed but also physical force is applied to the fine particles.

In this preferred embodiment, with the surface potential of the fine particles changed so as to eliminate the electrostatic attractive force acting between the fine particles and the component elements of the ultrapure water supply system or to produce electrical repulsive force between the two, physical force is applied to the fine particles, whereby the fine particles can be removed more easily.

Preferably, in the step (a), the basic solution or the solution of surfactant is caused to flow through the at least part of the ultrapure water supply system at a flow velocity of 0.5 m/sec to 2.0 m/sec.

According to this preferred embodiment, when the basic solution or the solution of surfactant flows through the system, the solution contacts with the fine particles in the system and, in addition, applies physical force thereto, thus promoting the removal of the fine particles.

Alternatively, in the step (a), with the basic solution or the solution of surfactant kept in contact with the at least part of the ultrapure water supply system, the solution is applied with small-amplitude vibration. According to this preferred embodiment, the solution contacts with the fine particles in the system and changes the surface potential thereof, and in addition, small-amplitude vibration of the solution is transmitted to the fine particles to apply physical force thereto, whereby the removal of the fine particles can be promoted.

Preferably, the basic solution is an aqueous solution of ammonia or ammonium salt, or an aqueous solution of alkali metal hydroxide, or a mixture of an aqueous solution of ammonia or ammonium salt and an aqueous solution of alkali metal hydroxide. Alternatively, the basic solution may be pure water or ultrapure water in which alkaline gas is dissolved.

The basic solution used in this preferred embodiment can change the surface potential of the fine particles without fail, thus facilitating the removal of the fine particles.

BEST MODE OF CARRYING OUT THE INVENTION

A cleaning method according to one embodiment of the present invention will be hereinafter described with reference to the drawings.

The cleaning method of this embodiment is applied to cleaning of the whole or a part (system component element such as a filtration membrane) of an ultrapure water supply system.

Figure 1:
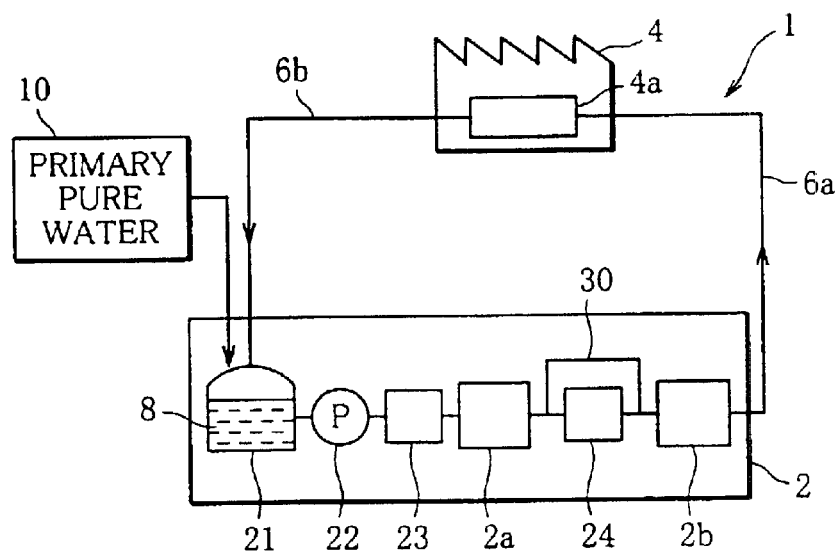
FIG. 1 is a schematic diagram showing an ultrapure water supply system according to one embodiment of the present invention.

An ultrapure water supply system 1 to which the cleaning method is applied includes, as shown in FIG. 1, an ultrapure water production apparatus (secondary pure water production apparatus) 2 for obtaining ultrapure water from primary pure water 10. The primary pure water 10 is obtained, for example, by passing raw water through a reverse osmosis membrane, then treating the water by using anion and cation exchange resins in order, and further passing the water through a reverse osmosis membrane.

The ultrapure water production apparatus 2 is connected through an ultrapure water supply passage 6a to a cleaning apparatus 4a arranged at a point 4 of use of ultrapure water. The cleaning apparatus 4a cleans objects to be cleaned, such as semiconductors, by using the ultrapure water supplied from the ultrapure water production apparatus 2. Namely, the ultrapure water supply system 1 of this embodiment is suited for supplying ultrapure water used in semiconductor manufacturing process.

The ultrapure water production apparatus (secondary pure water production apparatus) 2 has a tank 21 for storing the primary pure water 10. The tank 21 is connected via an ultrapure water return passage 6b to the cleaning apparatus 4a at the point 4 of use so that the part of the ultrapure water which was not used by the cleaning apparatus 4a may return to the tank 21.

In the ultrapure water production apparatus 2, the pure water (the primary pure water 10 and the ultrapure water returned from the point 4 of use) in the tank 21 is fed by the action of a pump 22 to a heat exchanger 23 where the water temperature is adjusted, and then to an ultraviolet oxidation device 2a where organic matter is removed from the pure water. Further, the pure water is treated in an ion exchange resin tower 24 and then subjected to a final treatment in an ultrafiltration membrane device 2b where fine particles are removed from the pure water, thereby producing ultrapure water meeting quality requirements. In FIG. 1, reference numeral 30 denotes a bypass passage bypassing the ion exchange resin tower 24.

The ultrapure water is supplied from the ultrapure water production apparatus 2 to the cleaning apparatus 4a at the point 4 of use through the ultrapure water supply passage 6a; part of the ultrapure water is used by the cleaning apparatus while the unused ultrapure water is returned to the tank 21 of the ultrapure water production apparatus 2 through the ultrapure water return passage 6b. The ultrapure water used at the point 4 of use is collected as wastewater at the point 4 of use and is treated.

To explain the ultrapure water supply system in more detail, each of the passages 6a and 6b basically comprises a pipe and may include a tank, a pump, joints, valves and other devices arranged in the middle thereof.

The pipes (passages) 6a and 6b may be made of any material insofar as the constituents of the material used are not eluted from the pipes into the ultrapure water. For example, the pipes 6a and 6b may be made of PVC (polyvinyl chloride), PPS (polyphenylene sulfide), PVDF (polyvinylidene diflloride), FRP (fiber-reinforced plastic), PFA (tetrafluoroethylene-perfluoroalkyl vinyl ether copolymer), stainless steel, etc.

The cleaning method according to this embodiment will be now described.

The cleaning method is used for cleaning the ultrapure water supply system, as mentioned above, or a component element thereof (e.g., filtration membrane), and is characterized in that the surface potential of fine particles present in the system is changed to facilitate the removal of the fine particles.

First, the principle of removal of fine particles employed in the cleaning method will be explained.

Primarily due to the flow of liquid (pure water, ultrapure water, cleaning liquid, etc.) within the ultrapure water supply system 1, the system elements 2a, 2b, 4a, 6a, 6b, 21 to 24 and 30 are charged with electricity and also fine particles inside the system 1 are charged with electricity. The polarity and magnitude of the surface potential of the fine particles are heavily dependent on the properties, pH in particular, of the liquid, whereas the polarity and magnitude of the surface potential of the system elements made of materials such as PVC are not so heavily dependent on the properties of the liquid.

Figure 2:
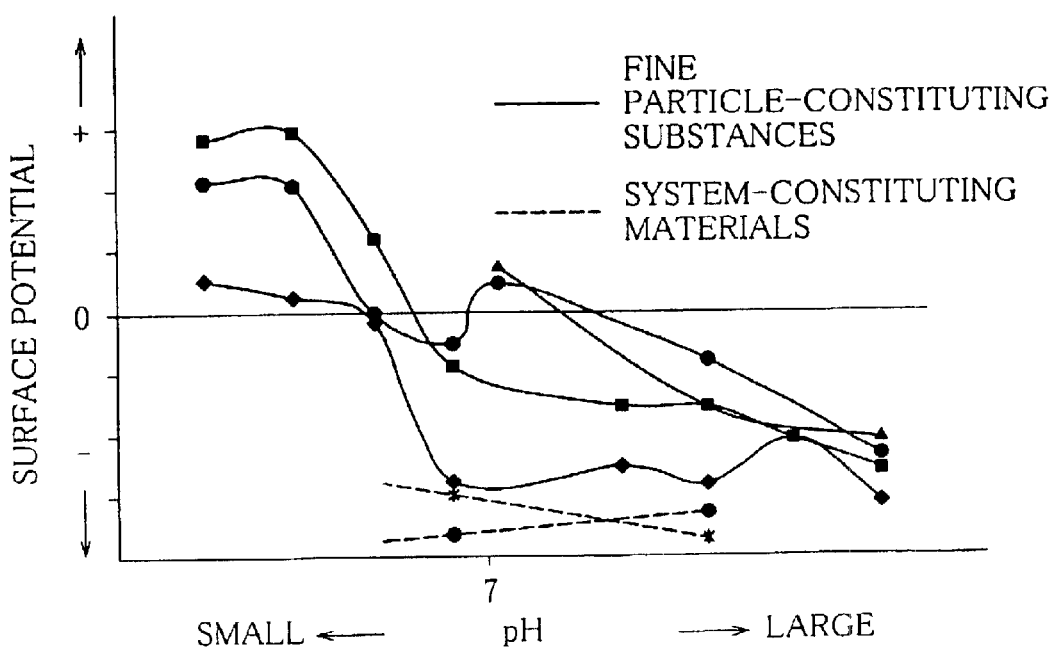
FIG. 2 is a chart showing surface potentials of fine particle-constituting substances and system-constituting materials as a function of pH.

The relationship between the surface potential and the pH of the liquid is illustrated in FIG. 2. FIG. 2 shows surface potentials of four kinds of substances constituting the fine particles and of two kinds of materials constituting the system elements, as a function of the pH. The surface potentials were measured by an electrophoretic light scattering measurement method with the pH varied as indicated by individual marks in FIG. 2.

In FIG. 2, the solid lines indicate the surface potential-pH characteristics of the respective fine particle-constituting substances and the dashed lines indicate the surface potential-pH characteristics of the respective system-constituting materials. The marks of rhombus (♦), triangle (▲), square (■) and circle (●) on the solid lines correspond respectively to silica ($SiO_2$), alumina ($Al_2O_3$), polystylene latex (PSL) and silicon nitrite ($Si_3N_4$). The marks of asterisk (*) and circle (●) on the dashed lines correspond to PVC and PVDF, respectively.

As shown in FIG. 2, where the liquid has a pH value smaller than "7" and thus shows near neutrality or acidity, the surface potentials of fine particles constituted by silica, alumina, PSL and $Si_3N_4$ take values close to 0 mV or positive values. Where the liquid has a pH value larger than "7" and shows alkalinity, the fine particle-constituting substances have negative surface potentials. On the other hand, the system elements constituted by PVC or PVDF show negative surface potentials throughout the whole pH range, regardless of the pH of the liquid.

The above fact indicates that in a certain situation, the surface potentials of the system elements and those of the fine particles have opposite polarities, and in this case, the fine particles remain stuck on the surfaces of the system elements due to electrostatic attractive force produced between the system elements and the fine particles.

According to the cleaning method of this embodiment, an alkaline liquid, for example, is made to contact with the fine particles in the system to negatively charge the fine particles so that the surface potentials of the fine particles may be of the same polarity as those of the system elements, thereby eliminating the electrostatic attractive force acting between the fine particles and the system elements or producing electrostatic repulsive force between the two. As a result, the fine particles can be easily removed from the system.

In the cleaning method based on the above principle, a cleaning liquid (chemical) having the effect of changing the surface potential is used. As a cleaning liquid having such an effect, basic solution is preferred. The basic solution to be used is not particularly limited insofar as the solution is soluble in water and the pH thereof falls within a predetermined range, and may preferably be an aqueous solution of ammonia or ammonium salt, for example. Other preferred basic solutions include an aqueous solution of tetraalkylammonium compound or tetraalkylammonium salt, an aqueous solution of tetramethylammonium hydroxide (TMAH), and an aqueous solution of a metal hydroxide such as sodium hydroxide or potassium hydroxide. The basic solution may alternatively be obtained by dissolving an alkaline gas such as ammonia gas in ultrapure water. The pH and concentration of the basic solution are determined principally in order that the basic solution may have satisfactory system cleaning capability and at the same time that the residual constituent of the solution in the system may be small.

In the case of the aqueous solution of ammonia or sodium hydroxide, the pH thereof is set to 7 to 14, preferably, to 9 to 11.

The concentration of the aqueous solution of ammonia for cleaning the system is set to 5 to 500 mg/L, preferably, to a range of 50 to 100 mg/L. The concentration of the aqueous solution of sodium hydroxide-for cleaning the system is set to 0.01 to 4000 mg/L, preferably, to a range of 0.4 to 40 mg/L.

The concentration of the aqueous solution of ammonia for cleaning the filtration membrane is set to 20 to 2000 mg/L, preferably, to a range of 100 to 1000 mg/L, and the concentration of the aqueous solution of sodium hydroxide for cleaning the filtration membrane is set to 0.4 to 10,000 mg/L, preferably, to a range of 100 to 1000 mg/L.

The concentration of the aqueous solution of TMAH may be 10 to 100 ppm, preferably, 40 to 60 ppm.

In the case of the basic solution obtained by dissolving an alkaline gas in ultrapure water, ammonia gas, for example, is introduced into the system so that the solution obtained may have a pH value and an ammonia concentration falling within the above respective ranges. The concentration of the ammonia gas to be used is not particularly limited and may be about 5 to 1000 ppm.

The following describes the manner of how the ultrapure water supply system 1 of FIG. 1 is cleaned using the aforementioned basic solution as the cleaning liquid.

First, a cleaning liquid 8, of which the pH and the concentration are adjusted in advance so as to fall within the aforementioned respective preferred ranges, is introduced into the tank 21. Alternatively, a basic salt, for example, is put into the tank 21 storing the primary pure water 10 or the ultrapure water returned from the point of use, to thereby prepare the cleaning liquid 8 within the tank.

Subsequently, following an ordinary ultrapure water circulation path which starts from the ultrapure water production apparatus 2, passes through the passage 6a, the point 4 of use and the passage 6b, and returns to the ultrapure water production apparatus 2, the cleaning liquid 8 is caused to circulate through the system 1 once or repeatedly for several hours, preferably, 0.5 to 3 hours. In this manner, the basic solution as the cleaning liquid 8 is made to flow through the circulation path, whereby the basic solution contacts with the individual parts of the system 1, that is, the pump 22, the heat exchanger 23, the ultraviolet oxidation device 2a, the ultrafiltration device 2b, the pipes connecting these devices, and the passages 6a and 6b, and clean these devices and pipes.

During the cleaning, the flow velocity of the cleaning liquid 8 is set to 0.5 m/sec or higher, preferably, to a value falling within a range of 0.75 to 2.0 m/sec.

Figure 3:
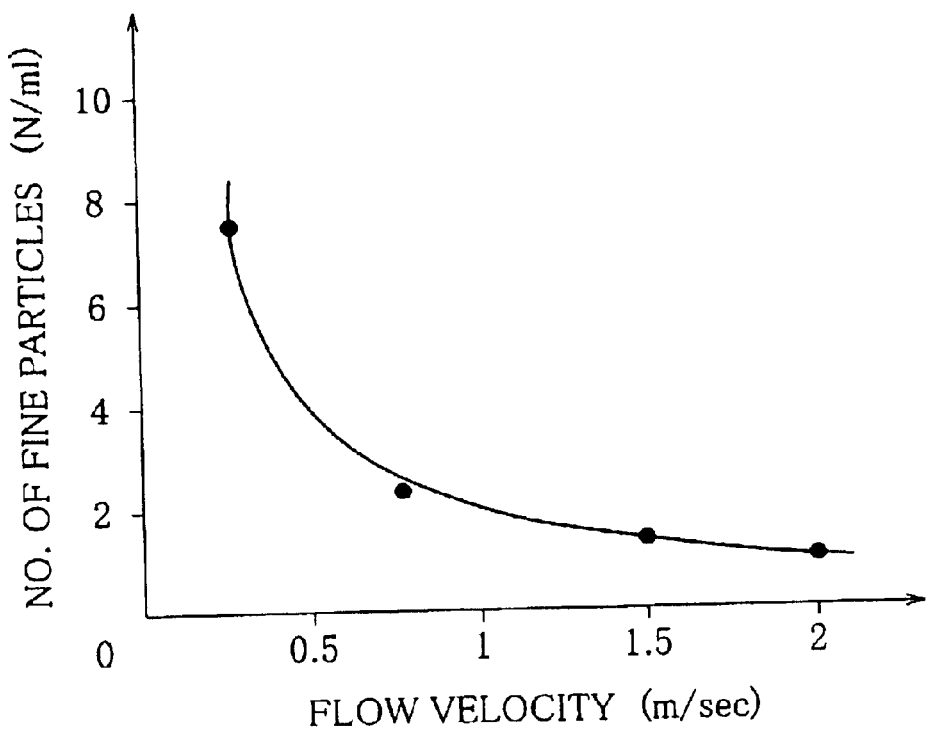
FIG. 3 is a chart showing the number of fine particles in ultrapure water used in rinsing after system cleaning, as a function of the flow velocity of a cleaning liquid used in the system cleaning.

FIG. 3 shows the relationship between the flow velocity of the cleaning liquid and the number of fine particles contained in ultrapure water used for rinsing after the system cleaning. To obtain a flow velocity-fine particle count curve as shown in FIG. 3, the number of fine particles was measured after the cleaning liquid was caused to flow at each of flow velocities of 0.25, 0.75, 1.5 and 2 m/sec, as indicated by the mark ● in FIG. 3. Specifically, as in the case of the fine particle count measurement performed in Example 1 described later, rinsing was carried out following the system cleaning by means of the cleaning liquid, and upon lapse of a whole day after the start of the rinsing, the ultrapure water used for the rinsing was sampled and filtered by means of a filter. Then, the number of fine particles trapped on the filter was counted using a scanning electron microscope. As seen from FIG. 3, the cleaning effect obtained with the flow velocity 0.25 m/sec is not of satisfactorily level, and the cleaning effect does not significantly improve and becomes almost saturated at a flow velocity exceeding 2.0 m/sec. Accordingly, a preferred range of the flow velocity is considered to be 0.5 to 2.0 m/sec.

In the case of cleaning a filtration membrane such as the ultrafiltration membrane, the flow velocity of the cleaning liquid is set to 0.5 to 2.5 m/sec, preferably, 0.75 to 2.0 m/sec.

As the cleaning liquid 8 is caused to flow through the system 1 in this manner, the cleaning liquid 8 comes into contact with fine particles in the system 1, so that the polarity of the surface potential of the fine particles changes from positive to negative while the negative polarity of the surface potential of the component parts constituting the system elements remains the same. Consequently, the surface potential of the fine particles has the same polarity as the surface potential of the system elements, with the result that the electrostatic attractive force acting between the fine particles and the system elements is eliminated or electrical repulsive force is produced between the fine particles and the system elements, facilitating the removal of the fine particles from the surfaces of the system elements. Further, the flow of the cleaning liquid 8 applies physical force to the fine particles, thus making it easier to remove the fine particles. Namely, the flow of the cleaning liquid 8 makes it possible or makes it easier to separate fine particles adhering to the surfaces of the system elements, for example.

The used cleaning liquid 8 which has been circulated once or repeatedly through the system 1 is discharged from a blow pipe (not shown) of the system 1. At this time, the fine particles separated from the system elements and contained in the cleaning liquid 8 are discharged from the system 1 to outside together with the cleaning liquid 8. The used cleaning liquid 8 is subjected to adsorption by means of a weak acid cation exchange resin, for example.

According to the system cleaning method described above, even in the case where the base or basic salt contained in the cleaning liquid 8 has a low concentration of, for example, several tens of mg/L, the cleaning liquid 8 can produce a satisfactory effect of separating/removing the fine particles. If necessary, after the cleaning using the cleaning liquid 8, ultrapure water is introduced into the system 1 to remove the residual constituent of the solution in the system.

In the case where the cleaning liquid 8 used has a low concentration, only a small amount of the basic constituent of the cleaning liquid 8 remains in the system 1, and this makes it possible to shorten the cleaning time for removing the residual constituent, whereby the overall cleaning operation performed using the cleaning liquid 8 and the ultrapure water can be completed in a short time. Thus, where the ultrapure water supply system 1 is newly installed, only a short set-up time is required. Also, in the subsequent production of ultrapure water, increase of TOC attributable to the basic constituent can be suppressed, contributing to the improvement in quality of the ultrapure water produced.

There are no particular restrictions on the temperature of the cleaning liquid 8, but from the point of view of cleaning capability, the temperature of the cleaning liquid should desirably be as high as possible within a range such that the heat resistance temperatures of the parts and pipes constituting the ultrapure water supply system 1 are not exceeded, and more specifically, is set to 20 to 100° C. For example, when cleaning the system or system elements made of PVC having a heat resistance temperature of about 45° C., the temperature of the cleaning liquid 8 is set to approximately 40° C., and for the system or system elements made of PVDF having a heat resistance temperature of about 80° C., the temperature of the cleaning liquid is set to a value not higher than 75 to 80° C. In the case of the system or system elements made of stainless steel, the cleaning liquid whose temperature is adjusted to approximately 100° C. may be used.

While the cleaning method according to one embodiment of the present invention has been described, it is to be noted that the present invention is not limited to the foregoing embodiment alone and may be modified in various ways.

For example, the ultrapure water supply system to which the cleaning method of the present invention is applied is not limited to the one shown in FIG. 1, and it is not essential that the ultrapure water supply system be constructed such that the ultrapure water which was not used at the point of use is returned to the ultrapure water production apparatus. Also, a reverse osmosis membrane or other filtration devices, not shown in FIG. 1, may be incorporated appropriately into the ultrapure water production apparatus 2. Further, the heat exchanger 23 and the ion exchange resin tower 24, appearing in FIG. 1, are not indispensable system component elements.

In the forgoing embodiment, the cleaning liquid is circulated once or repeatedly through the ultrapure water supply system so as to contact with fine particles inside the system, thereby changing the surface potential of the fine particles and also applying physical force to the fine particles. Alternatively, with the ultrapure water supply system or part thereof filled with the cleaning liquid, the cleaning liquid may be applied with small-amplitude vibration caused by ultrasonic waves, for example. In this case, the cleaning liquid filled in the system contacts with fine particles in the system, thus changing the surface potential of the fine particles, and small-amplitude vibrations of the cleaning liquid are transmitted to the fine particles, thus applying physical force to the fine particles. It should be noted, however, that positively applying physical force to the fine particles is not essential to the invention, and the cleaning liquid filled in the system may be merely discharged from the system after the system is left at rest for a predetermined time with the cleaning liquid filled therein.

Also, it is not essential in the present invention that the whole ultrapure water supply system be cleaned, and part of the system, for example, the ultrafiltration membrane device 2b, the ultraviolet oxidation device 2a, the pipes 6a and 6b and their joints, may be individually cleaned. In this case, the cleaning liquid is introduced into a to-be-cleaned part of the system from a location immediately upstream of the to-be-cleaned part and is discharged from a location immediately downstream of the to-be-cleaned part, thereby letting the cleaning liquid flow through the to-be-cleaned part. Instead of causing the cleaning liquid to flow through the to-be-cleaned part, the to-be-cleaned part may be simply filled with the cleaning liquid, and after a lapse of a predetermined time, the cleaning liquid may be discharged from the to-be-cleaned part. Further, with the to-be-cleaned part filled with the cleaning liquid, the cleaning liquid may be vibrated and then be discharged.

In this manner, the system can be cleaned with the system elements, for example, the ultrafiltration membrane, attached to the ultrapure water production apparatus, but the system elements may be detached from the apparatus for cleaning. In this case, the cleaning liquid may be made to flow through a housing containing the ultrafiltration membrane, or the housing may be simply filled with the cleaning liquid, with vibrations applied to the cleaning liquid as needed.

Further, in the present invention, a surfactant, water in which hydrogen gas is dissolved, or a mixture of the two, for example, may be used as the cleaning liquid in place of the basic cleaning liquid. Alternatively, electrode plates may be immersed in pure water together with a to-be-cleaned part of the system, and with a separating membrane arranged between the electrode plates, electric current is passed through the electrode plates, thereby to change the surface potential of the fine particles.

Where a surfactant is used as the cleaning liquid, cation surfactant such as primary amine derivative or quaternary ammonium salt, or neutral surfactant of carboxylic acid type or sulfate type may be used. Also, an anion surfactant such as alkylbenzenesulfonate may be used in combination with basic salt. The concentration of the surfactant is set to 1 to 1000 mg/L, usually, to several tens of mg/L.

In order to enhance the cleaning effect, the cleaning liquid may be introduced from the outlet of the ultrafiltration membrane 2b into the ultrapure water passage 6a.

EXAMPLE 1

1. Cleaning of Ultrapure Water Supply System

An ultrapure water supply system 1 as shown in FIG. 1 was newly installed and was cleaned in the manner described below.

Ammonia water was added to the pure water in the tank 21 of the ultrapure water production apparatus 2 to prepare a cleaning liquid 8 having a concentration of 50 mg/L and a pH value of 10.5, and the cleaning liquid 8 was made to circulate at a flow velocity of 0.75 m/sec through the system for two hours along the circulation path: ultrapure water production apparatus 2→passage 6a→point 4 of use→passage 6b→ultrapure water production apparatus 2. In this case, the cleaning liquid 8 was caused to flow through the bypass passage 30 bypassing the ion exchange resin tower 24, and thus the ion exchange resin tower 24 was not cleaned. Also, the temperature of the cleaning liquid 8 was adjusted to 40° C. by the heat exchanger 23.

After the system was cleaned using the cleaning liquid 8, the cleaning liquid 8 was discharged from the blow pipe, not shown. Subsequently, the primary pure water 10 was introduced into the tank 21, and the ultrapure water produced by the ultrapure water production apparatus 2 was circulated through the system 1 to remove the residual constituent of the cleaning liquid remaining in the system. The ultrapure water containing the constituent of the cleaning liquid was then discharged from the system to outside.

2. Evaluation of Cleaning Capability

After the constituent of the cleaning liquid was removed following the system cleaning, the system 1 was operated under normal conditions, and the ultrapure water was sampled at the point 4 of use a plurality of times at given intervals of time. The sampled ultrapure water was measured as to the number of fine particles contained and the TOC, to obtain a change with time in the quality of the ultrapure water. To measure the number of fine particles, a given amount of the ultrapure water was passed through a filter, and the number of fine particles (with a particle diameter greater than or equal to 0.05 pm) trapped on the filter was counted using a scanning electron microscope. The TOC was measured by an ultraviolet oxidation-resistivity detection method.

Figure 5:
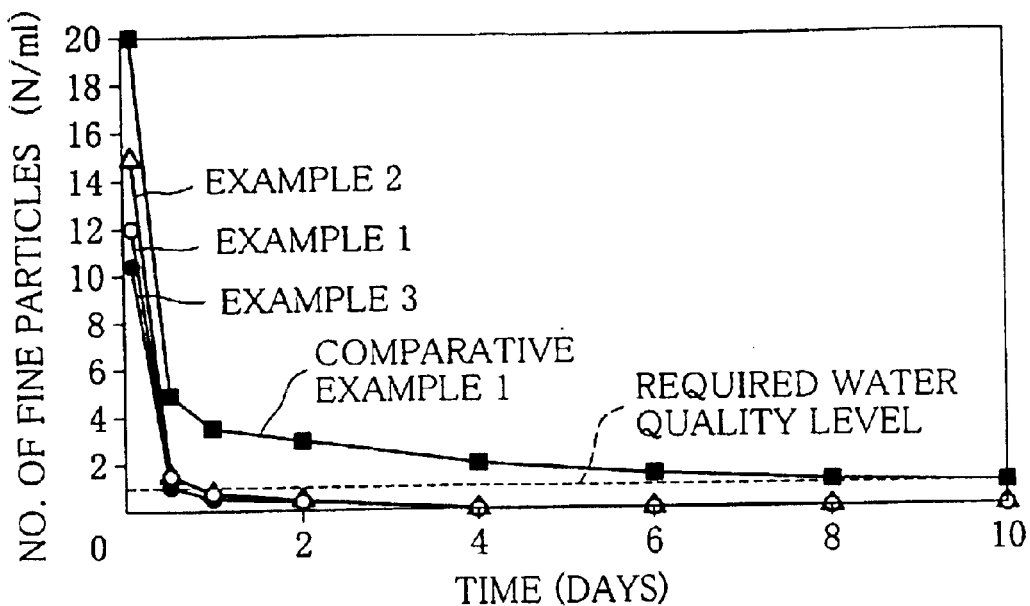
FIG. 5 is a graph showing time-based changes in the number of fine particles in the ultrapure water according to examples and a comparative example after the cleaning of the ultrapure water supply system.
Figure 6:
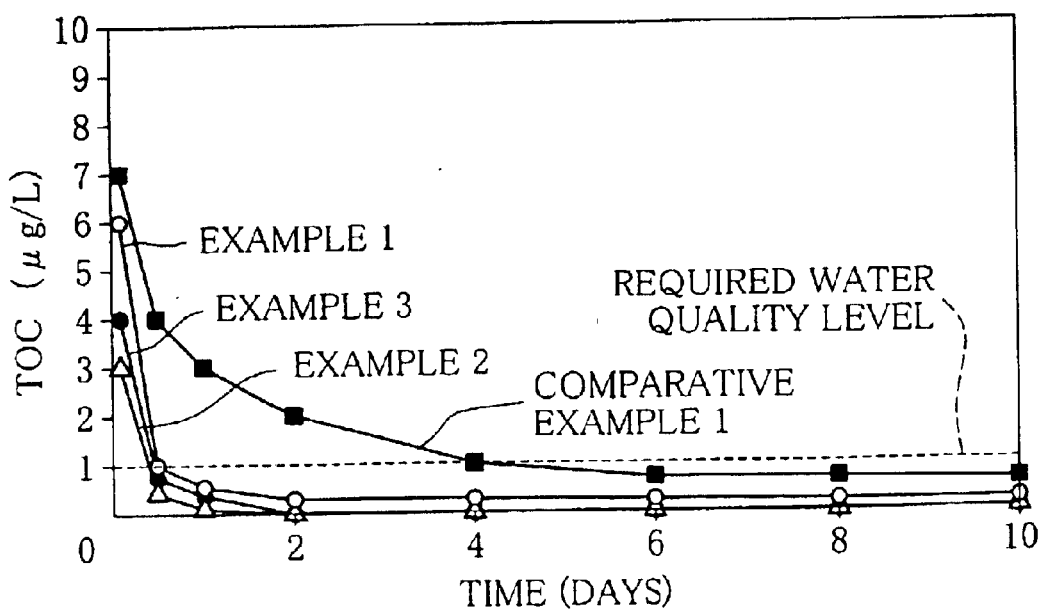
FIG. 6 is a graph showing time-based changes in the TOC in the ultrapure water according to the examples and the comparative example after the cleaning of the ultrapure water supply system.
Figure 7:
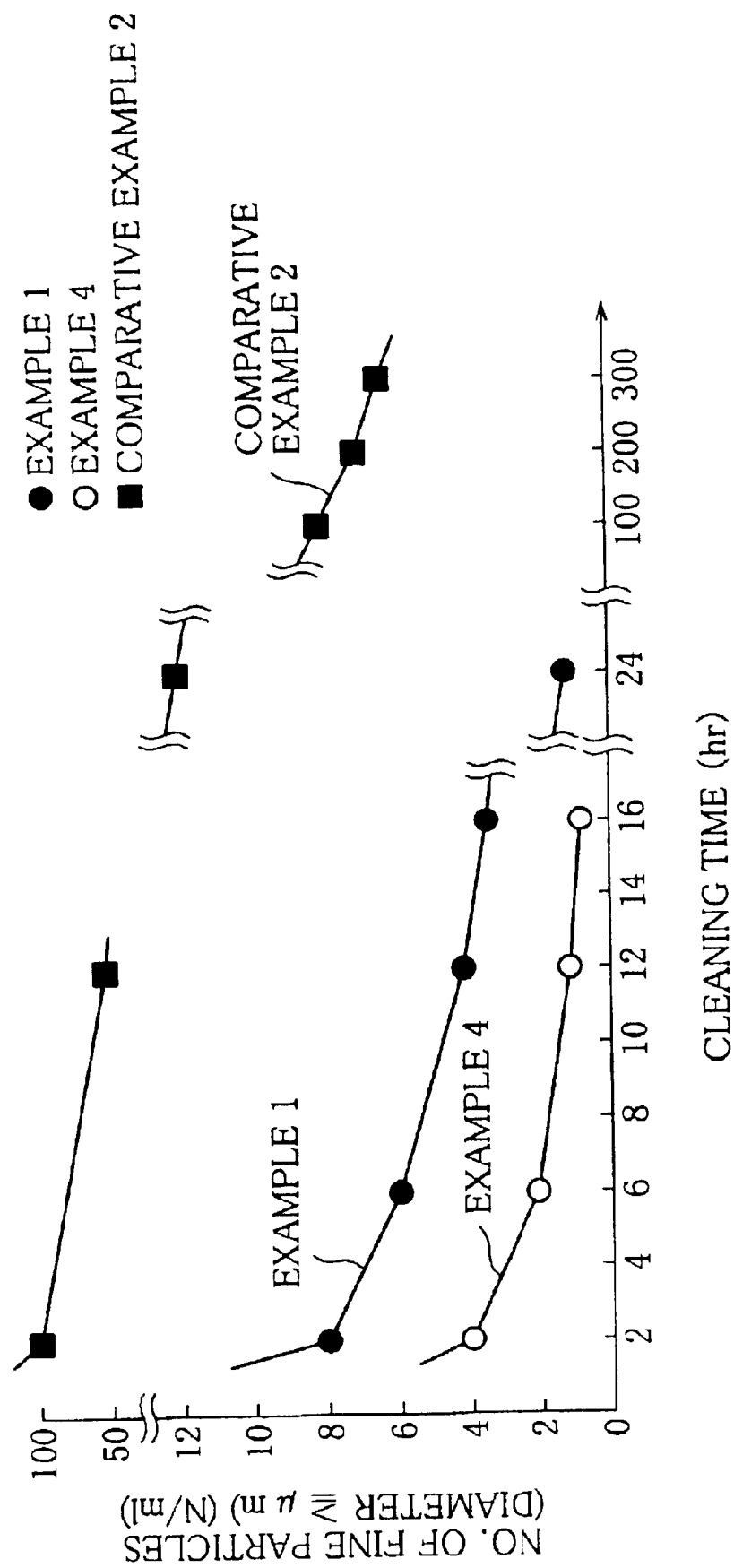
FIG. 7 is a graph showing time-based changes in the number of fine particles in the ultrapure water according to examples and a comparative example after the cleaning of a filtration membrane.

The measurement results are shown in FIGS. 5, 6 and 7. The dashed line in the individual figures represents the required quality of ultrapure water used at the point of use.

EXAMPLE 2

Sodium hydroxide was added to the pure water in the tank 21 of the system 1 to prepare a cleaning liquid 8 having a concentration of 4 mg/L and a pH value of 10.5, and the cleaning liquid 8 was circulated through the system 1 in the same manner as in Example 1, to clean the system 1. A time-based change in the quality of the ultrapure water produced by the thus-cleaned system 1 was measured in the same manner as in Example 1. The measurement results are shown in FIGS. 5 and 6.

EXAMPLE 3

Figure 4:
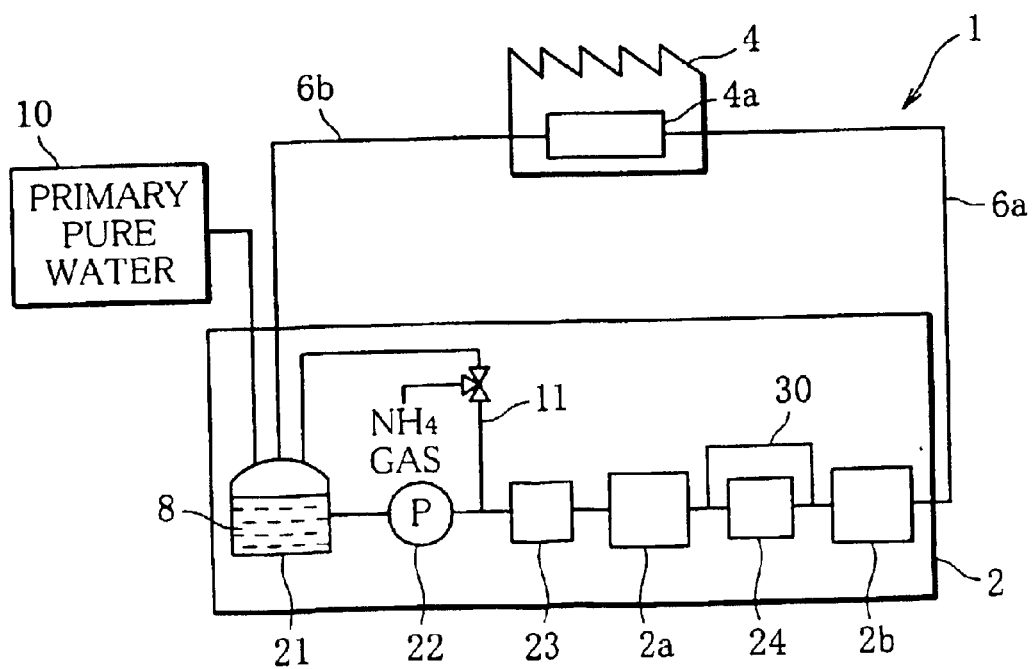
FIG. 4 is a schematic diagram showing an ultrapure water supply system according to a working example of the present invention.

An ammonia gas inlet pipe 11 was added to the ultrapure water supply system 1 shown in FIG. 1, thereby constructing a system 1 shown in FIG. 4.

Ammonia gas was introduced from the inlet pipe 11 into the ultrapure water supplied from the tank 21, to obtain a cleaning liquid 8 having an ammonia concentration of 50 mg/L and a pH value of 10.5. Then, in the same manner as in Example 1, the cleaning liquid 8 was circulated through the system 1 to clean the system, and a time-based change in the quality of the ultrapure water produced by the cleaned system was measured. The measurement results are shown in FIGS. 5 and 6.

EXAMPLE 4

An ultrafiltration membrane made of polysulfone was detached from the housing and was immersed in the same cleaning liquid 8 as used in Example 1 for two hours with ultrasonic waves applied to the cleaning liquid 8 to vibrate the same, thereby cleaning the ultrafiltration membrane. Subsequently, with the ultrafiltration membrane attached to the housing, the ultrapure water was caused to flow through the housing, and the number of fine particles contained in the ultrapure water passed through the ultrafiltration membrane was measured by the same method as used in Examples 1 to 3. The measurement results are shown in FIG. 7.

Comparative Example 1

Using warm water of 40° C. as the cleaning liquid, the ultrapure water supply system was cleaned in the same manner as in Examples 1 to 3, and then the ultrapure water produced by the system was sampled at the point of use to examine the water quality. The measurement results are shown in FIGS. 5 and 6.

Comparative Example 2

Using ultrapure water as the cleaning liquid, the ultrafiltration membrane was cleaned in the same manner as in Example 4, and then the number of fine particles in the ultrapure water produced by the cleaned system was measured. The measurement results are shown in FIG. 7.

Evaluation of Examples 1–5 and Comparative Examples 1–2

As is clear from FIG. 5, in the ultrapure water supply system cleaned by the cleaning methods according to Examples 1 to 3, the number of fine particles in the ultrapure water produced by the system dropped to a level lower than an allowable upper-limit value (1/mL) before a whole day passed since the start of operation of the system following the completion of the cleaning. Namely, the cleaning methods of Examples 1 to 3 proved to have high fine particles removing capability. On the other hand, in the system cleaned by the method according to Comparative Example 1, more than eight days were required for the number of fine particles in the ultrapure water produced by the system to drop to a level lower than the allowable upper-limit value, and thus, it was found that the cleaning method of Comparative Example 1 had poor fine particle removing capability.

Also as seen from FIG. 6, in Examples 1 to 3, the time required for the TOC of the ultrapure water produced by the system to drop to a level lower than an allowable upper-limit value (1 μg/L) was shorter than a whole day as counted from the start of operation of the system, proving that the cleaning methods of Examples 1 to 3 also have excellent organic matter removing capability. On the other hand, in Comparative Example 1 it took four to five days for the TOC to decrease to a level lower than the allowable upper-limit value, and it was found that the cleaning method of Comparative Example 1 had poor organic matter removing capability.

Further, as is clear from FIG. 7, in Examples 1 and 4, the number of fine particles decreased to a level lower than 1/mL before a whole day passed since the start of operation of the system having the cleaned filtration membrane attached thereto. Especially, in the case of Example 4, the number of fine particles dropped to a level lower than 1/mL in 12 hours. On the other hand, in Comparative Example 2, the number of fine particles did not drop below 1/mL even after the lapse of 300 hours from the start of operation of the system.

What is claimed is:

1. A cleaning method for removing fine particles remaining adhered to at least part of an ultrapure water supply system due to electrostatic attractive force, the ultrapure water supply system having an ultrapure water production apparatus connected to a point of use of ultrapure water via a passage, comprising the steps of:

(a) changing surface potential of fine particles remaining adhered to the at least part of the ultrapure water supply system into the same polarity as that of component parts constituting elements of the ultrapure water supply system by changing the surface potential of the fine particles from positive to negative, thereby eliminating the the electrostatic attractive force between the fine particles and the at least, least part of the ultrapure water supply system or producing repulsive electrostatic force between them; and (b) discharging the negatively charged fine particles, which are removed from the at least part of the ultrapure water supply system by elimination of the electrostatic attractive force or production of the repulsive electrostatic force, to the outside of the ultrapure water supply system, together with cleaning liquid or ultrapure water for rinsing, wherein the cleaning liquid or ultrapure water for rinsing containing the negatively charged fine particles bypasses an element of the ultrapure water supply system, the element serving to remove the negatively charged fine particles in the ultrapure water supply system.

2. The cleaning method according to claim 1, wherein in said step (a), the surface potential of the fine particles is changed by bringing the fine particles into contact with a basic solution or a solution of surfactant.

3. The cleaning method according to claim 2, wherein in said step (a), the basic solution or the solution of surfactant is caused to flow through the at least part of the ultrapure water supply system at a flow velocity of 0.5 m/sec to 2.0 m/sec.

4. The cleaning method according to claim 2, wherein the basic solution is an aqueous solution of ammonia or ammonium salt, or an aqueous solution of alkali metal hydroxide, or a mixture of the aqueous solution of ammonia or ammonium salt and the aqueous solution of alkali metal hydroxide.

5. The cleaning method according to claim 2, wherein the basic solution is pure water or ultrapure water in which alkaline gas is dissolved.

6. The cleaning method according to claim 3, wherein the basic solution is an aqueous solution of ammonia or ammonium salt, or an aqueous solution of alkali metal hydroxide, or a mixture of the aqueous solution of ammonia or ammonium salt and the aqueous solution of alkali metal hydroxide.

7. The cleaning method according to claim 3, wherein the basic solution is pure water or ultrapure water in which alkaline gas is dissolved.

8. A cleaning method for cleaning at least part of an ultrapure water supply system having an ultrapure water production apparatus connected to a point of use of ultrapure water via a passage, comprising the steps of:
(a) changing surface potential of fine particles present in the at least part of the ultrapure water supply system into the same polarity as that of component parts constituting elements of the ultrapure water supply system by changing the surface potential of the fine particles from positive to negative by bringing the fine particles into contact with a basic solution or a solution of surfactant; and
(b) discharging the fine particles from the at least part of the ultrapure water supply system to the outside of the ultrapure water supply system, together with cleaning liquid or ultrapure water for rinsing;

wherein, in step (a)

physical force is applied to the fine particles by keeping the basic solution or the solution of surfactant in contact with the at least part of the ultrapure water supply system, while applying small-amplitude vibrations with ultrasonic waves.

9. The cleaning method according to claim 8, wherein the basic solution is an aqueous solution of ammonia or ammonium salt, or an aqueous solution of alkali metal hydroxide, or a mixture of the aqueous solution of ammonia or ammonium salt and the aqueous solution of alkali metal hydroxide.

10. The cleaning method according to claim 8, wherein the basic solution is pure water or ultrapure water in which alkaline gas is dissolved.

* * * * *